(12) United States Patent
Ishikawa et al.

(10) Patent No.: US 8,793,505 B2
(45) Date of Patent: Jul. 29, 2014

(54) ENCRYPTION PROCESSING APPARATUS

(75) Inventors: Manabu Ishikawa, Machida (JP);
Akihiko Yushiya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/531,275

(22) Filed: Jun. 22, 2012

(65) Prior Publication Data

US 2012/0331305 A1   Dec. 27, 2012

(30) Foreign Application Priority Data

Jun. 27, 2011   (JP) ................................. 2011-142243

(51) Int. Cl.
*G06F 12/14*   (2006.01)

(52) U.S. Cl.
USPC ......................................................... 713/189

(58) Field of Classification Search
None
See application file for complete search history.

(56) References Cited

U.S. PATENT DOCUMENTS

2006/0104308 A1*   5/2006   Pinkerton et al. ............. 370/469
2012/0036364 A1*   2/2012   Yoneda et al. ................ 713/175

FOREIGN PATENT DOCUMENTS

JP   2010-57123 A   3/2010

* cited by examiner

*Primary Examiner* — Brandon Hoffman
(74) *Attorney, Agent, or Firm* — Canon U.S.A., Inc., IP Division

(57) ABSTRACT

In order to reduce the number of data transfers and to increase parallel processing of decryption processing and authentication processing, an encryption processing apparatus is provided that includes an input/output data that processes input/output data to an encryption/decryption processing unit and an authentication processing unit, where the input/output data processing unit calculates a parameter used by the authentication processing unit from input data to the input/output data processing unit and forms input data to the authentication processing unit from the calculated parameter or a parameter calculated from data processed by the encryption/decryption processing unit and the input data to the input/output data processing unit.

7 Claims, 9 Drawing Sheets

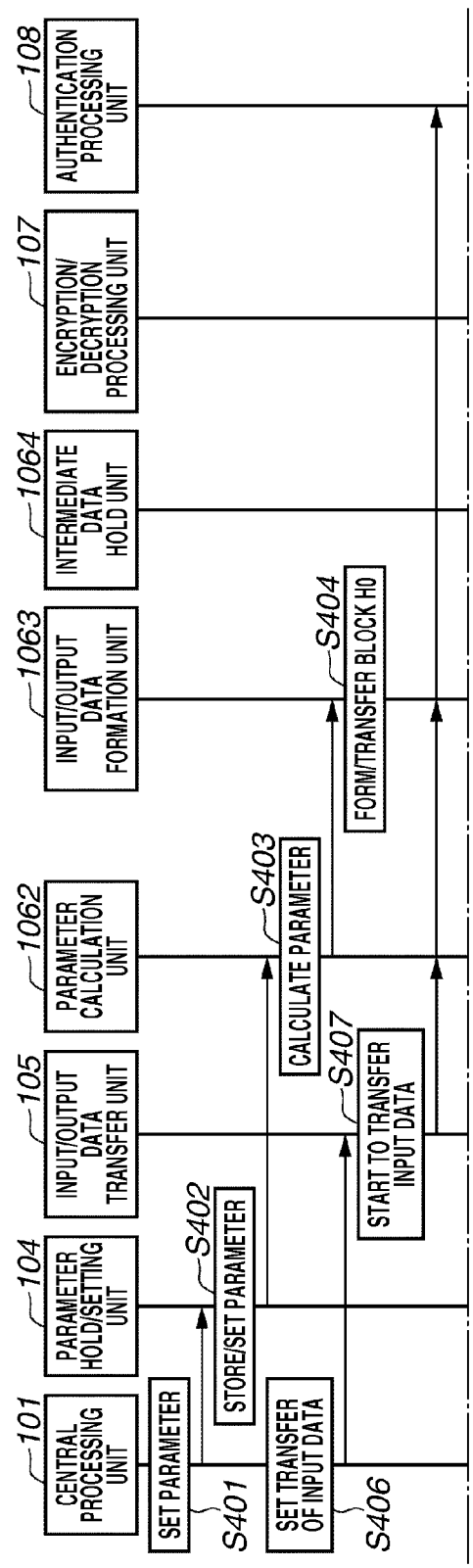

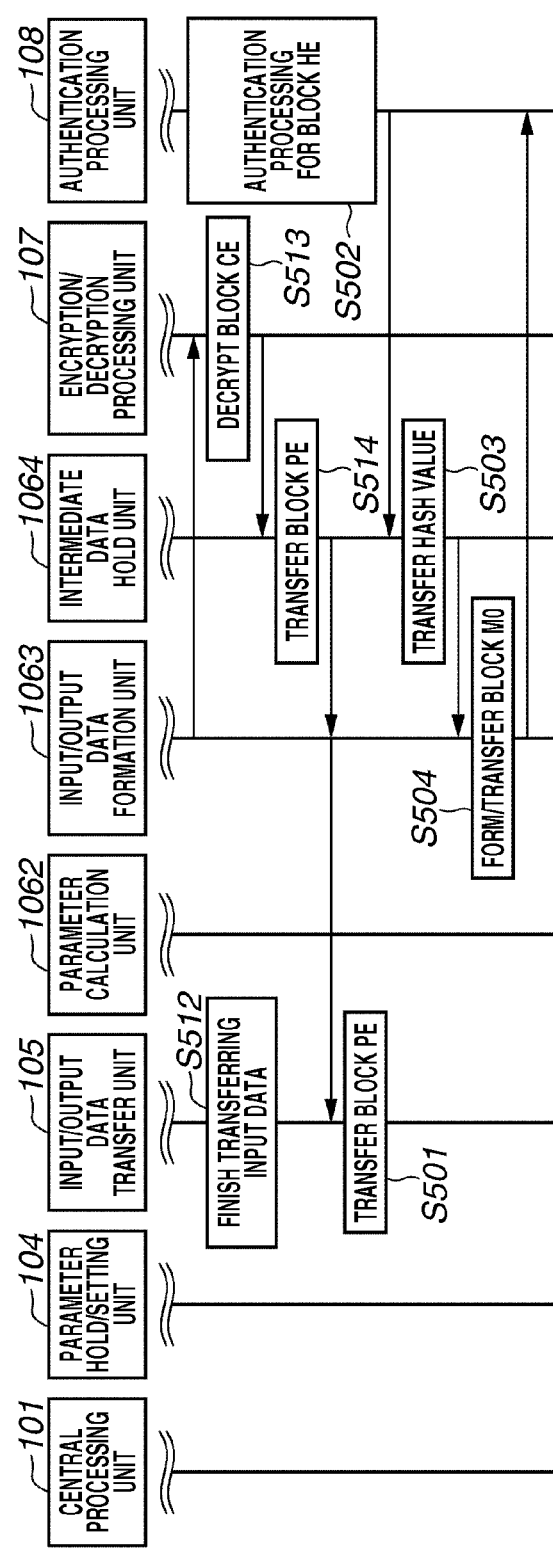

ENCRYPTION PROCESSING APPARATUS

BACKGROUND OF THE INVENTION

1. Field of the Invention

The present invention relates to an encryption processing apparatus.

2. Description of the Related Art

In recent years, data communication has often been performed between various types of digital devices by connecting the digital devices to a network, and an opportunity to perform data communication on the Internet has also been increased. In such communication between the digital devices on the network, data to be sent and received may be monitored or tampered with. A communication protocol for protecting safety of data communication from monitoring or tampering with is required. Internet Protocol Security (IPsec) and Secure Socket Layer/Transport Layer Security (SSL/TLS) including an encryption/decryption function and an authentication function, have been widely used as a standard technique.

Conventionally, such communication encryption processing has often been implemented by means of software. However, an amount of data in the data communication on the network has been increasing every year, and a real-time processing has often been required. Thus, an increase in the speed of communication encryption processing has been needed.

Therefore, a method for implementing the communication encryption processing by hardware and parallelizing the encryption/decryption processing and the authentication processing in the communication encryption processing to speedup the communication encryption processing has been used. Japanese Patent Application Laid-Open No. 2010-57123 discusses a method for parallelizing encryption/decryption processing and authentication processing in SSL/TLS receiving processing.

In Japanese Patent Application Laid-Open No. 2010-57123, however, decryption processing for calculating an authentication parameter, decryption processing for payload data, and authentication processing cannot be collectively implemented by hardware in SSL/TLS receiving processing. Switching between software processing and hardware processing, setting of hardware processing, software processing, and data transfer are required to be sequentially performed to perform the decryption processing and the authentication processing, which prevents the speed of the communication encryption processing from increasing.

SUMMARY OF THE INVENTION

An aspect of the present invention is directed to an encryption processing apparatus capable of decreasing the number of times of transfer of data than in the conventional techniques, to increase parallel processing of decryption processing and authentication processing.

According to an aspect of the present invention, an encryption processing apparatus includes an encryption/decryption processing unit configured to perform decryption processing, an authentication processing unit configured to perform authentication processing, and an input/output data processing unit configured to process input/output data to the decryption processing unit and the authentication processing unit, wherein the input/output data processing unit includes a parameter calculation unit configured to calculate a parameter to be used in the authentication processing unit from input data to the input/output data processing unit, and an input/output data formation unit configured to form input data to the authentication processing unit from the parameter calculated by the parameter calculation unit or a parameter calculated from data processed by the encryption/decryption processing unit and the input data to the input/output data processing unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

SSL/TLS receiving processing according to an exemplary embodiment of the present invention will be described below. Examples of Advanced Encryption Standard (AES)-128 and Secure Hash Algorithm 1 (SHA-1) will be described as the SSL/TLS receiving processing.

Figure 1:
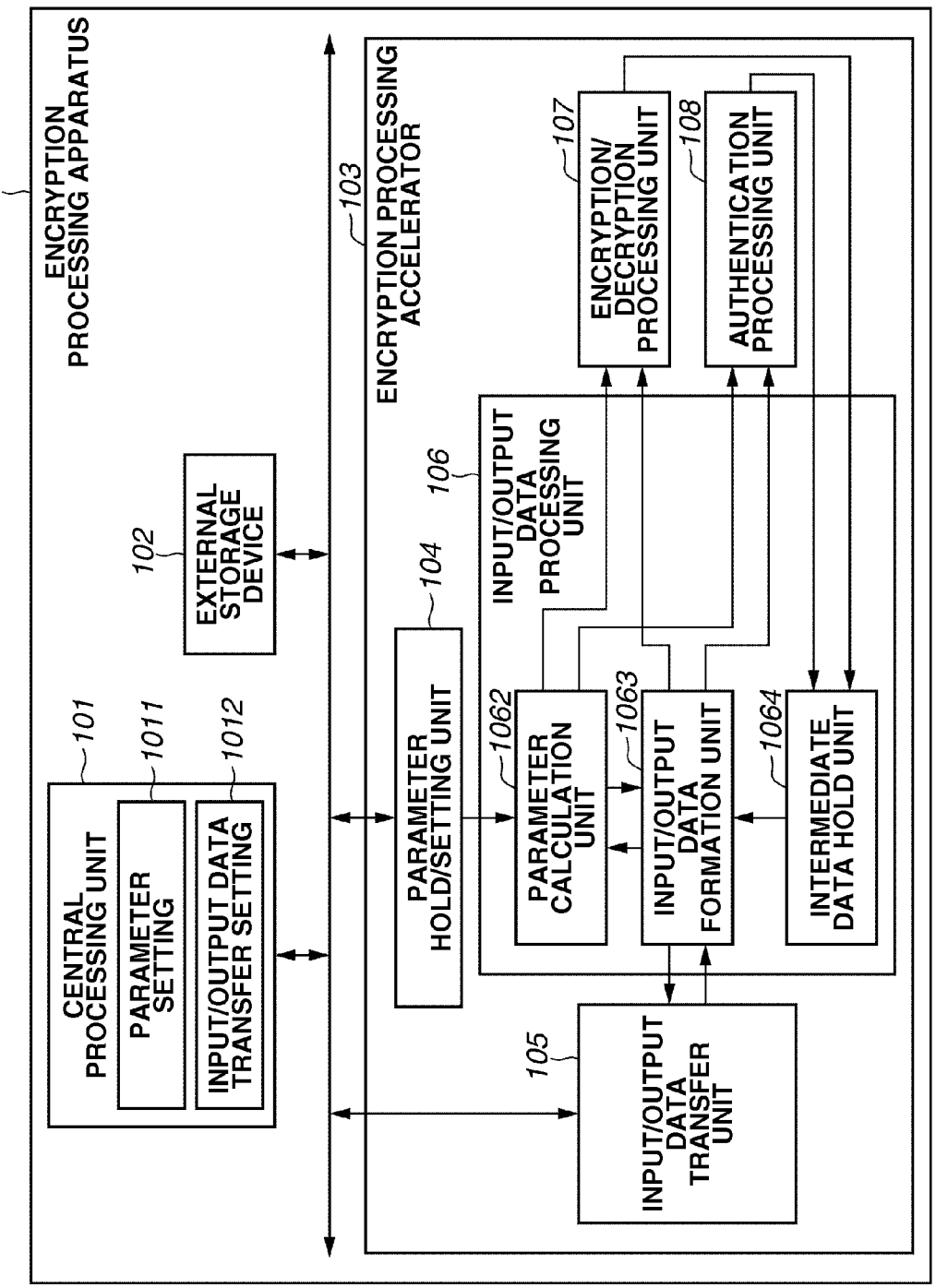
FIG. 1 is a block diagram illustrating a configuration of an encryption processing apparatus according to an exemplary embodiment.

FIG. 1 is a block diagram illustrating a configuration of an encryption processing apparatus according to an exemplary embodiment of the present invention. An encryption processing apparatus 100 includes a central processing unit 101, an external storage device 102, and an encryption processing accelerator 103. The central processing unit 101 sets a parameter in the encryption processing accelerator 103, and controls input/output data transfer setting between the external storage device 102 and the encryption processing accelerator 103. The external storage device 102 stores input/output data to be transferred to and from the encryption processing accelerator 103 and the parameter set in the encryption processing accelerator 103.

The encryption processing accelerator 103 includes a parameter hold/setting unit 104, an input/output data transfer unit 105, an input/output data processing unit 106, an encryption/decryption processing unit 107, and an authentication processing unit 108.

The central processing unit 101 sets parameters required for communication encryption processing in the parameter hold/setting unit 104 and stores the parameters therein until the processing ends. The input/output data transfer unit 105 transfers input/output data to and from the external storage device 102 and the input/output data processing unit 106 according to the input/output data transfer setting performed by the central processing unit 101.

The input/output data processing unit 106 includes a parameter calculation unit 1062, an input/output data formation unit 1063, and an intermediate data hold unit 1064.

The parameter calculation unit 1062 calculates parameters required for encryption/decryption processing and authentication processing from the parameters stored in the parameter hold/setting unit 104, and input/output data formed by the input/output data formation unit 1063. Then, the parameter calculation unit 1062 sets the calculated parameters in the encryption/decryption processing unit 107 and the authentication processing unit 108, and generates input data and outputs it to the input/output data formation unit 1063.

The input/output data formation unit 1063 forms input data to the encryption/decryption processing unit 107 and the authentication processing unit 108, and outputs the formed input data to the encryption/decryption processing unit 107 and the authentication processing unit 108.

The input data is formed from input data transferred from the input/output data transfer unit 105, intermediate data transferred from the intermediate data hold unit 1064, and output data from the parameter calculation unit 1062. The input/output data formation unit 1063 forms output data from the intermediate data transferred from the intermediate data hold unit 1064, and transfers the formed output data to the input/output data transfer unit 105.

Output data from the encryption/decryption processing unit 107 and the authentication processing unit 108 are input to the intermediate data hold unit 1064, are temporarily stored therein, and are transferred to the input/output data formation unit 1063.

The parameter required for the encryption/decryption processing is set in the encryption/decryption processing unit 107 from the parameter calculation unit 1062, and the formed input data is input to the encryption/decryption processing unit 107 from the input/output data formation unit 1063. The encryption/decryption processing unit 107 outputs data obtained by encrypting/decrypting the input data to the intermediate data hold unit 1064.

The parameter required for the authentication processing is set in the authentication processing unit 108 from the parameter calculation unit 1062, and the formed input data is input to the authentication processing unit 108 from the input/output data formation unit 1063. The authentication processing unit 108 stores intermediate data that is being used in the authentication processing, while outputting output data to the intermediate data hold unit 1064 in the input/output data processing unit 106. While the output data is a processing end signal for each block in the authentication processing, the authentication processing unit 108 may output the intermediate data.

The encryption processing accelerator 103 performs processing according to setting, transfers data obtained by encryption/decryption processing and an authentication processing result to the external storage device 102, and notifies the central processing unit 101 of the end of the processing.

Data to be input to the encryption/decryption processing unit 107 in the SSL/TLS receiving processing will be described below.

Figure 2:
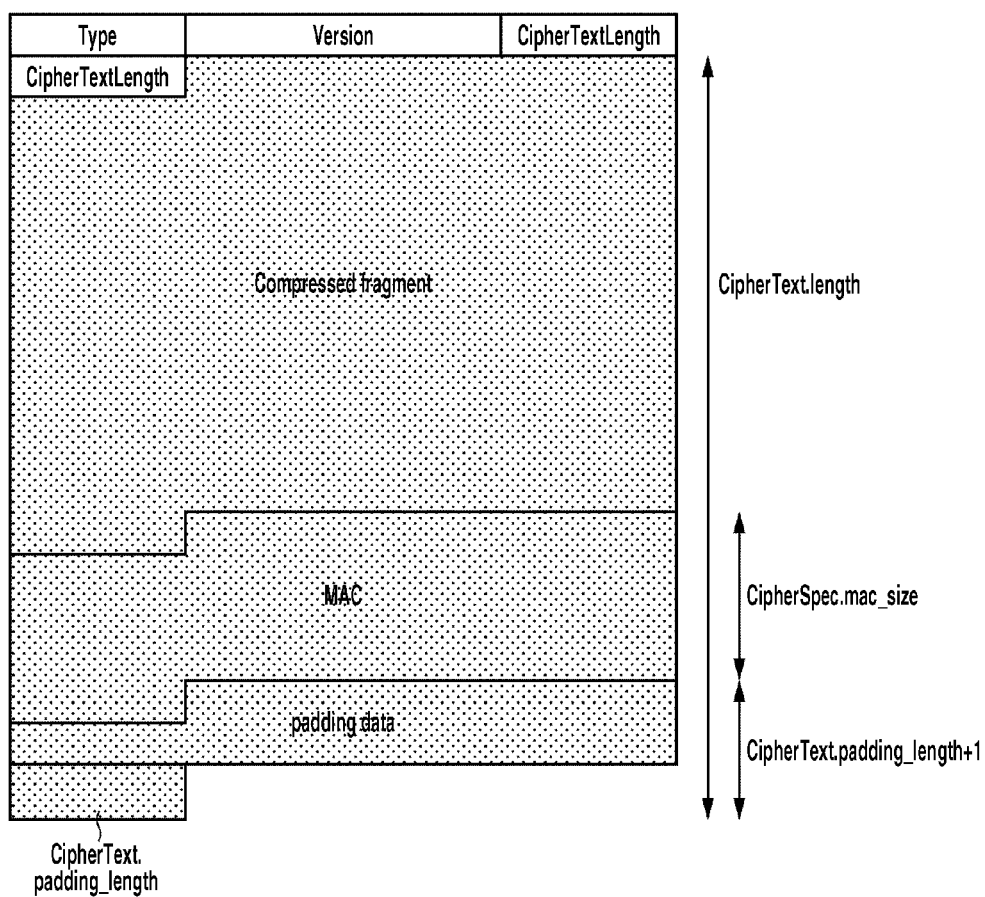
FIG. 2 illustrates a data format to be sent and received in SSL/TLS processing.

FIG. 2 illustrates a format of received data in SSL/TLS receiving processing. In FIG. 2, data in fields "Compressed fragment", "MAC value", "Padding data", and "CipherText.paddinglength" are connected to one another on the transmission side, and are encrypted using AES-128. The encryption/decryption processing unit 107 decrypts the encrypted data in the SSL/TLS receiving processing.

"Type", "Version", and "CipherText.length" correspond to a header portion. "Type" is the type of data stored in payload data in SSL/TLS, "Version" is the version of SSL/TLS, and "CipherText.length" is the data length of encrypted data. "Compressed fragment" is content data, and "MAC value" is an authentication code for tamper detection. "Padding data" is data to be added to increase data to be encrypted to the integral multiple of the block size of AES-128. "CipherText.paddinglength" is the data length of "Padding data" including "Cipher Text.paddinglength".

Encrypted data conforming to a format illustrated in FIG. 2 is generated for each packet or datagram. Decryption processing is performed for each packet or datagram.

Data to be input to the authentication processing unit 108 in SSL/TLS receiving processing will be described below.

Figure 3A:
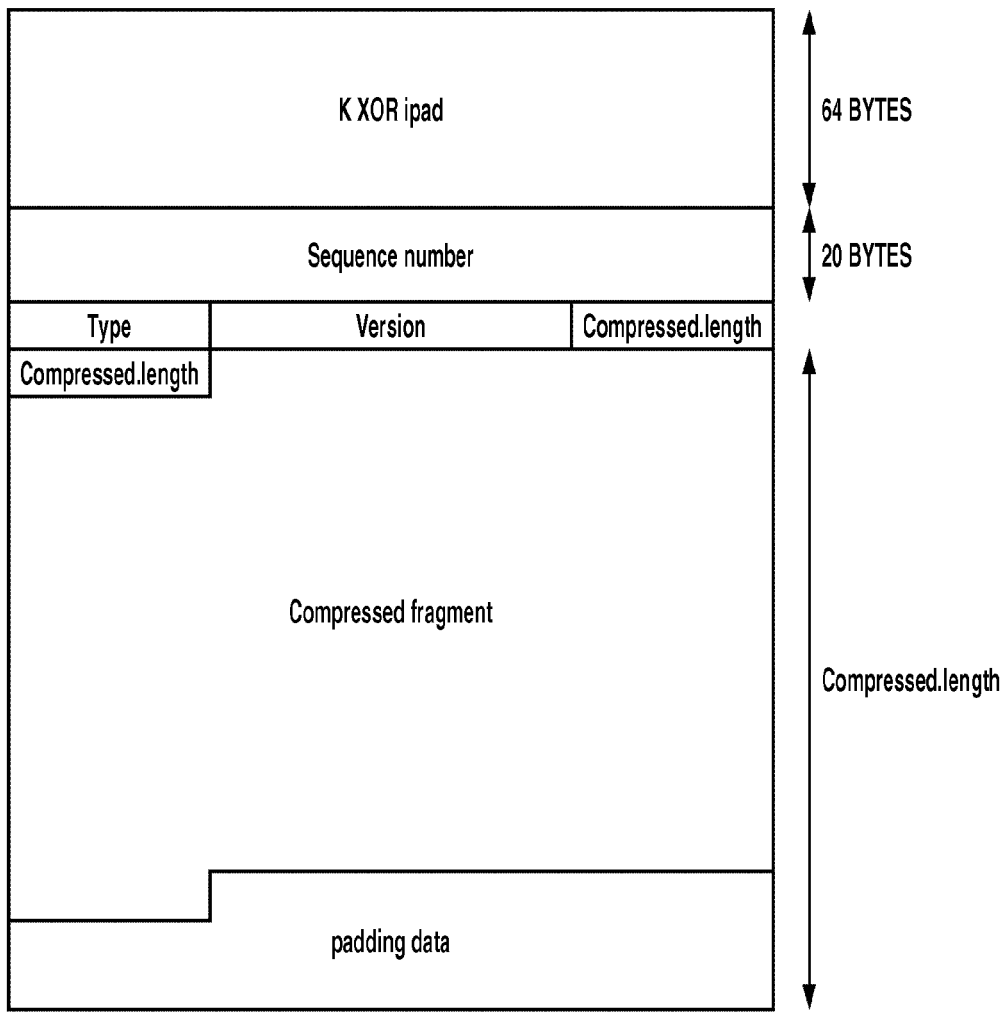
FIGS. 3A and 3B illustrate a datagram to be authenticated in SSL/TLS processing.
Figure 3B:
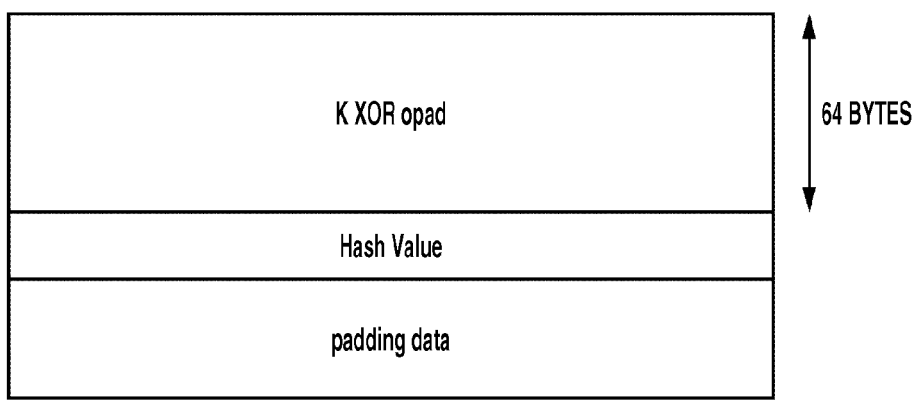

FIGS. 3A and 3B illustrate input data to the authentication processing unit 108 according to the present exemplary embodiment.

In FIG. 3A, "K XOR ipad" is an exclusive OR of Inside Key Pad (ipad) and a Message Authentication Code (MAC) writing secret key (K), which is shared between both sides of communication using the SSL/TLS protocol, set to 64 bytes by adding 0x00 to the end thereof. "Sequence number" is a counter value that is updated by adding the number of bytes of data for each sending of the data on the sending side, and for each receiving of the data on the receiving side.

"K XOR ipad" and "Sequence number" are not included in the received data illustrated in FIG. 2. Therefore, the central processing unit 101 sets "K" and "Sequence number" in the parameter hold/setting unit 104, and sends "K" and "Sequence number" to the parameter calculation unit 1062.

The parameter calculation unit 1062 calculates "K XOR ipad" from "K" and stored "ipad". The calculated "K XOR ipad" and "Sequence number" are sent to the input/output data formation unit 1063. The input/output data formation unit 1063 connects "K XOR ipad" and "Sequence number" to each other ahead of the received data illustrated in FIG. 2 as the input data to the authentication processing unit 108.

Subsequent to the connected "K XOR ipad" and "Sequence number", "Type" and "Version", which are not encrypted, are connected from the received data by the input/output data formation unit 1063. In the received data, "Type" and "Version" are followed by "CipherText.length". However, "CipherText.length" is required to be replaced with "Compressed.length" calculated by the following equation (1) in authentication processing:

$$\text{Compressed.length} = \text{CipherText.length} - \text{CipherSpec.mac\_size} - (\text{CipherText.padding\_length} + 1) \quad (1)$$

"CipherText.length", "CipherSpec.mac_size", "CipherText.padding_length+1" are defined in Request For Comment (RFC) 2104, and are in a relationship illustrated in FIG. 2. "CipherText.length" is the data length of the encrypted data, "CipherSpec.mac_size" is the data length of a MAC value, and "CipherText.padding_length" is the data length of padding data.

FIG. 3A illustrates data, to which "Compressed fragment" obtained by decryption processing is further connected by the input/output data formation unit 1063 and to which "Padding data" is added by the input/output data formation unit 1063. "Compressed fragment" and "Padding data" are obtained by decryption processing in the encryption/decryption processing unit 107. The authentication processing unit 108 calculates a hash value from the data illustrated in FIG. 3A.

The input/output data formation unit 1063 connects "K XOR opad", which is an exclusive OR of Outside Key Pad (opad) and the MAC writing secret key (K), which is shared between both sides of communication using the SSL/TLS protocol, set to 64 bytes by adding 0x00 to the end thereof and the above-mentioned calculated hash value to each other. The calculated hash value corresponds to "Hash Value" illustrated in FIG. 3B.

The parameter calculation unit 1062 calculates "K XOR opad" from "K" received from the parameter hold/setting unit 104 and stored "opad", and then sends "K XOR opad" to the input/output data formation unit 1063. FIG. 3B illustrates data to which "Padding data" obtained by decryption processing is added by the input/output data formation unit 1063. The data illustrated in FIG. 3B is input to the authentication processing unit 108. The authentication processing unit 108 calculates a last MAC value.

Figure 4B:
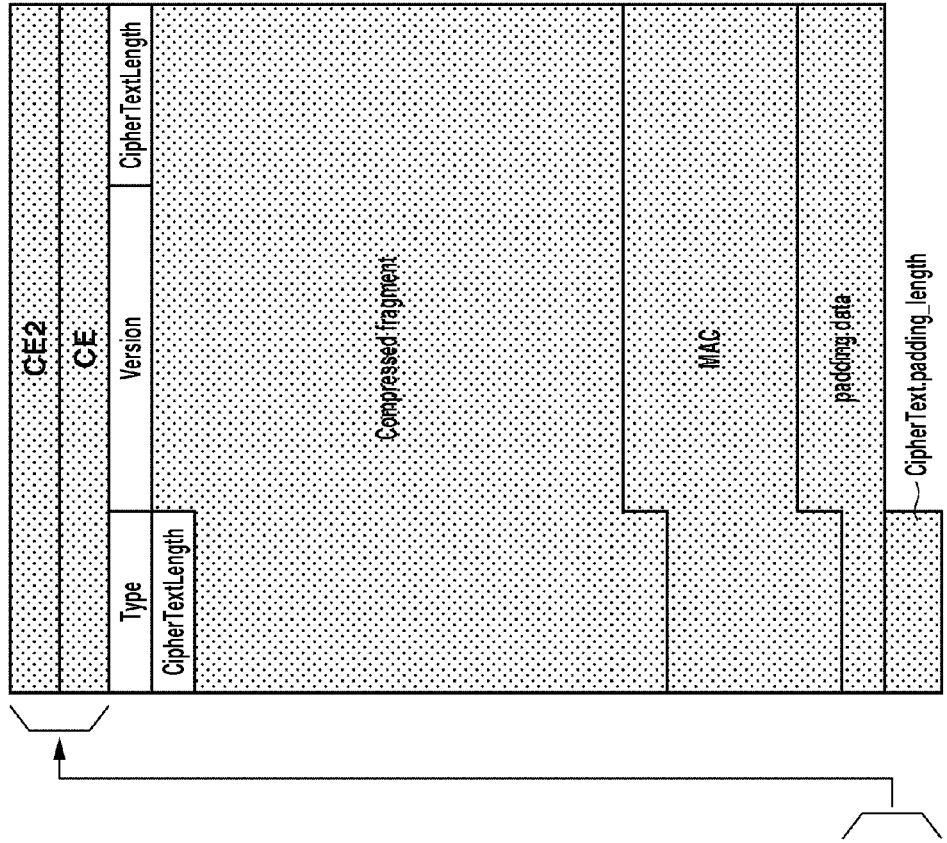
FIGS. 4A and 4B illustrate a datagram to be decrypted in SSL/TLS receiving processing.
Figure 4A:
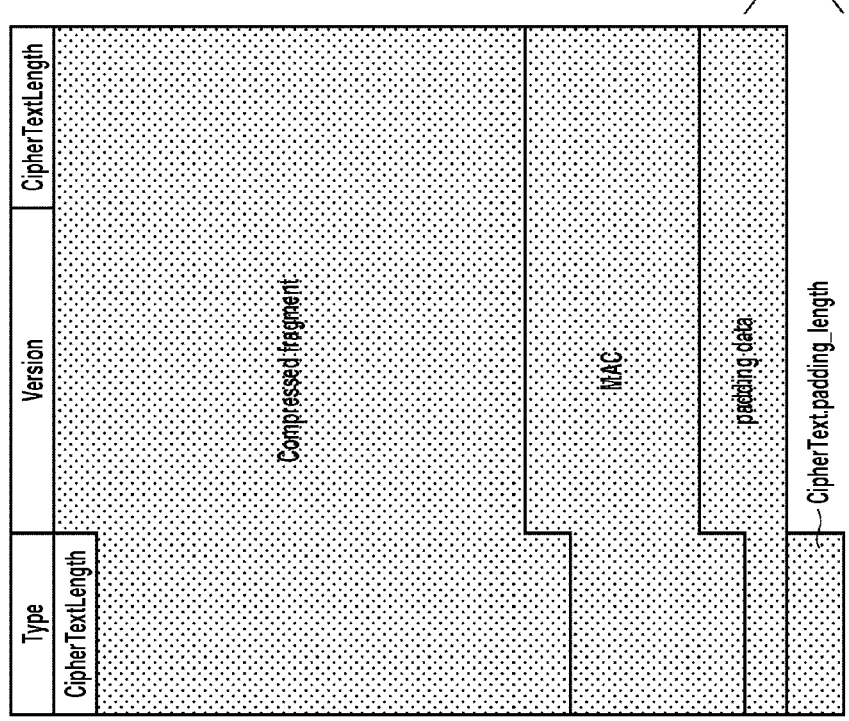

FIGS. 4A and 4B illustrate a datagram to be decrypted in SSL/TLS receiving processing. FIG. 4A illustrates received data in the SSL/TSL receiving processing, similar to FIG. 2. FIG. 4B illustrates input data to the encryption processing accelerator 103, i.e., data obtained by connecting last two blocks of encrypted data to a head portion of the received data illustrated in FIG. 4A.

The encryption/decryption processing unit 107 performs decryption processing in units of 16 bytes. Out of the last two blocks of the encrypted data connected to the head of the input data illustrated in FIG. 4B, the last block "CE" is used as data to be processed in decryption processing, and the second last block "CE2" is used as an initial vector in decryption processing of the block "CE".

Figure 5B:
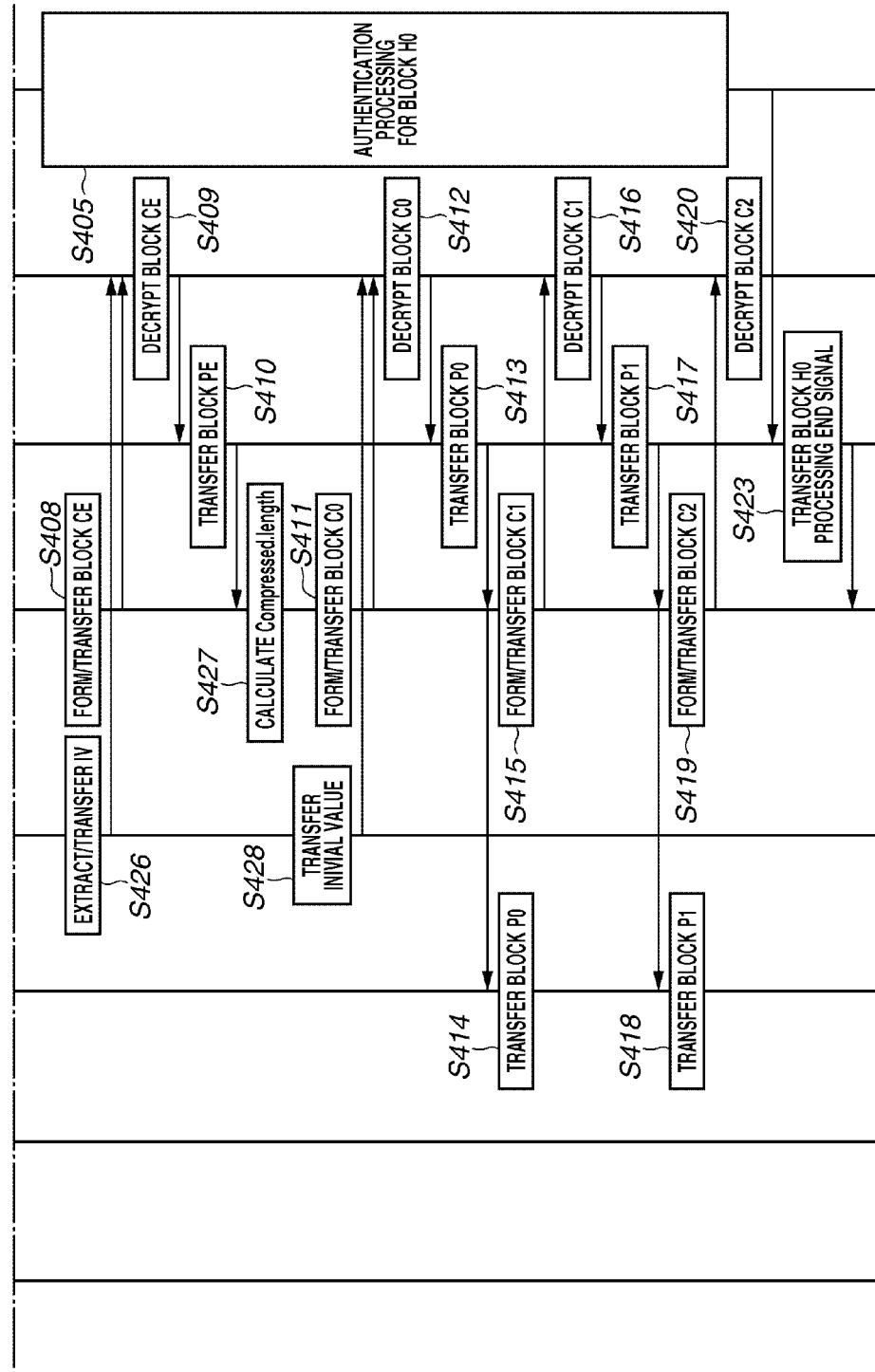
FIG. 5 (5A+5B+5C) illustrates a processing flow of a head portion of SSL/TLS receiving processing in the exemplary embodiment.
Figure 5C:
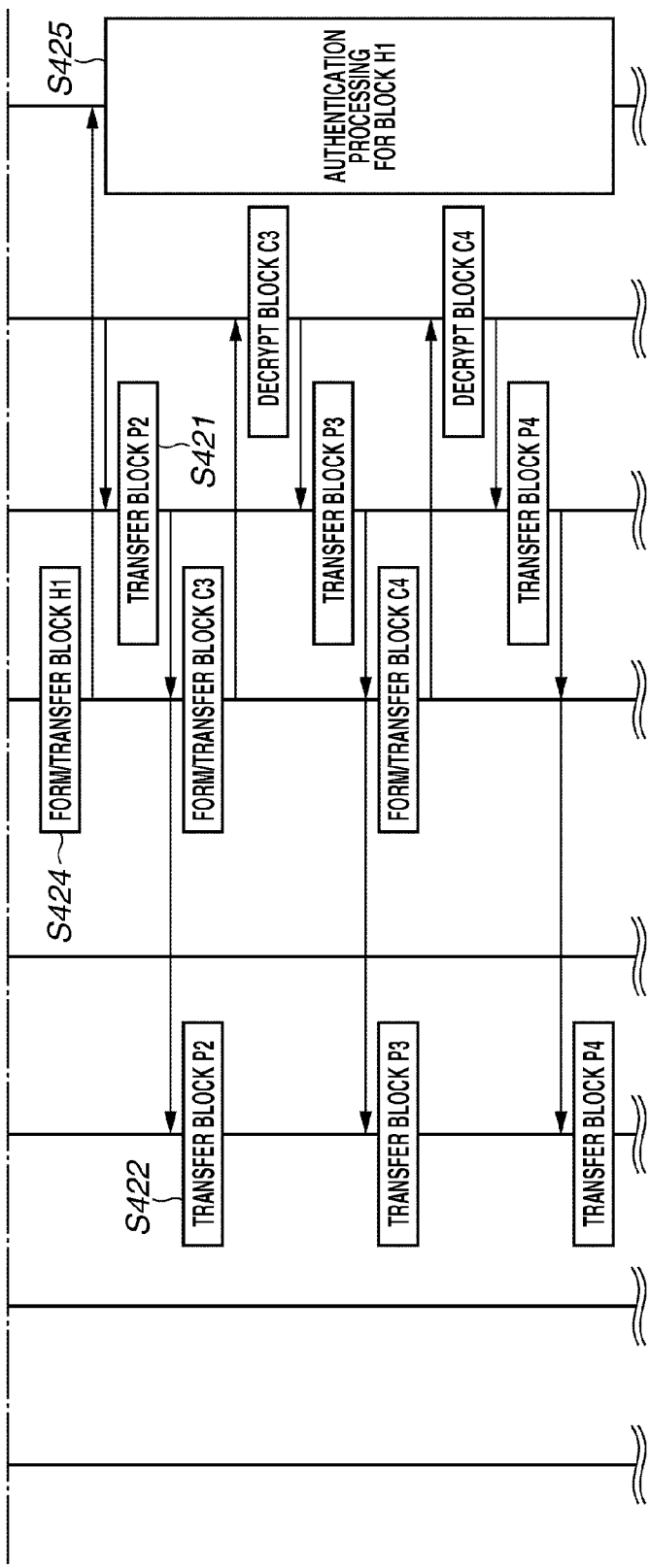

FIG. 5 (5A+5B+5C) illustrates a processing flow of a head portion of the SSL/TLS receiving processing in the present exemplary embodiment.

In step S401, the central processing unit 101 sets parameters required to operate the encryption processing accelerator 103 in the parameter hold/setting unit 104. In step S402, the parameter hold/setting unit 104 stores the set parameters while transferring the parameters to the parameter calculation unit 1062.

In step S403, the parameter calculation unit 1062 calculates, out of the transferred parameters, "K XOR ipad" and "K XOR opad" using "K", and transfers the calculated "K XOR ipad" and received "Sequence Number" to the input/output data formation unit 1063.

Processing relating to the parameters in steps S401, S402, and S403, and step S426 described below, is performed for each packet or datagram.

In step S404, the input/output data formation unit 1063 forms a block H0 that is input data to the authentication processing unit 108 from "K XOR ipad" and "Sequence Number", which have been transferred, and outputs the formed block H0 to the authentication processing unit 108.

In the present exemplary embodiment, the authentication processing unit 108 processes a hash function SHA-1. Therefore, the input data to the authentication processing unit 108 is in units of 64 bytes, and the block H0 that is the input data is "K XOR ipad" illustrated in FIG. 3A. "K XOR ipad" can be calculated from information shared between both sending and receiving sides ahead of data to be sent and received. Therefore, the authentication processing in the authentication processing unit 108 can be started before the received input data reaches 64 bytes.

In step S405, the authentication processing unit 108 performs hash value calculation processing for the block H0 which is the first block of the data to be authenticated illustrated in FIG. 3A.

The authentication processing unit 108 stores an intermediate value when the processing for the block H0 ends, and uses the stored intermediate value as an initial value in processing for the subsequent block H1. The intermediate value is stored in the authentication processing unit 108 every time processing for one block ends, and need not be output to the intermediate data hold unit 1064 until authentication processing for all data to be authenticated ends.

A block Hm is the (m+1)-th block obtained by dividing the data illustrated in FIG. 3A in units of 64 bytes. A block HE is the last block obtained by dividing the data illustrated in FIG. 3A in units of 64 bytes.

On the other hand, in step S406, the central processing unit 101 sets input/output data transfer setting between the input/output data transfer unit 105 and the external storage device 102 in the input/output data transfer unit 105. In step S407, the input/output data transfer unit 105 starts to transfer the input data illustrated in FIG. 4B to the input/output data transfer unit 105 from the external storage device 102.

While an initial vector is set as a parameter because an encryption mode is a Cipher Block Chaining (CBC) mode in the present exemplary embodiment, a counter value is set as a parameter if the encryption mode is a Click Through Ratio (CTR) mode. In step S426, the parameter calculation unit 1062 extracts a block "CE2" from the input data, and transfers the extracted block "CE2" as the initial vector to the encryption processing unit 107.

In step S408, the input/output data formation unit 1063 forms a block CE from the input data, and transfers the formed block CE to the encryption/decryption processing unit 107. A block Cn is the (n+1)-th block obtained by dividing encrypted data in units of 16 bytes in FIG. 2.

The block CE is the last block obtained by dividing the encrypted data in units of 16 bytes in FIG. 2. In FIG. 2, the encrypted data includes "Compressed fragment", "Padding data", "MAC value", and "CipherText. paddinglength".

In forming the input data to the authentication processing unit 108 illustrated in FIG. 3A, as described above, "CipherText.length" of the received data is required to be replaced with "Compressed.length". In this case, "CipherText.padding_length+1" is required for formation processing in the input/output data formation unit 1063. Therefore, a block including "CipherText.padding_length+1" is decrypted, ahead of an encrypted portion of the received data.

In SSL/TLS standards, the block including "CipherText.padding_length+1" is a last block of the received data. Therefore, a first block to be decrypted by the encryption/decryption processing unit 107 is the last block CE of the received data.

In step S409, the encryption/decryption processing unit 107 decrypts the block CE, and outputs a block PE obtained as a plain text by decrypting the block CE to the intermediate data hold unit 1064. A block Pn is obtained by decrypting the block Cn.

In step S410, the intermediate data hold unit 1064 transfers the block PE to the input/output data formation unit 1063. In step S427, the input/output data formation unit 1063 extracts "CipherText.padding_length" from the block PE, and calculates a parameter "Compressed.length" by the above-mentioned equation (1).

The other parameter "CipherText.length" is embedded as a plain text in the received data, and is set as a parameter in the parameter hold/setting unit 104. "CipherSpec.mac_size" is a fixed value determined according to an authentication algorithm selected by the authentication processing unit 108.

The block PE is used only to calculate the parameter "Compressed.length". Therefore, the block PE is required to be read again at the end of the decryption processing for the encrypted data, although not transferred to the external storage device 102 via the input/output data transfer unit 105.

While the decryption processing for the last block can also be omitted again by transferring the block PE to the external storage device 102 in step S410, the total processing time cannot be shortened, as described below.

In step S428, the parameter calculation unit 1062 transfers the initial vector, which has been transferred from the parameter hold/setting unit 104, to the encryption/decryption processing unit 107. In step S411, the input/output data formation unit 1063 forms a block C0 from the input data, and transfers the formed block C0 to the encryption processing unit 107. The block C0 is the first block obtained by dividing the encrypted data in units of 16 bytes.

In step S412, the encryption/decryption processing unit 107 decrypts the block C0, and outputs a block P0 obtained as a plain text by decrypting the block C0 to the intermediate data hold unit 1064. The encryption/decryption processing unit 107 also replaces the initial vector, which has been set in step S428, with the block C0, and stores the block C0 in the intermediate data hold unit 1064.

In step S413, the intermediate data hold unit 1064 transfers the block P0 to the input/output data formation unit 1063 and the input/output data transfer unit 105. In step S414, the input/output data transfer unit 105 transfers the block P0 to the external storage device 102.

In step S415, the input/output data formation unit 1063 forms a block C1 from the input data, and transfers the formed block C1 to the encryption processing unit 107. The block C1 is the second block obtained by dividing the encrypted data in units of 16 bytes in FIG. 2.

In steps S416, S417, and S418, a block C1 is formed/transferred and is decrypted, and a block P1 obtained as a plain text by decrypting the block C1 is transferred to the external storage device 102 in a similar procedure to that for the block C0.

In step S419, step S420, step S421, and step S422, a block C2 is formed/transferred and is decrypted, and a block P2 obtained as a plain text by decrypting the block C2 is transferred to the external storage device 102 in a similar procedure to that for the block C0.

Blocks P3, P4, . . . obtained as a plain text by decrypting blocks C3, C4, . . . in a similar procedure are transferred to the external storage device 102. Input data including the blocks C3, C4, . . . is required to be transferred to the input/output data transfer unit 105 from the external storage device 102, which is omitted and not clearly illustrated in FIG. 5.

The blocks may be collectively transferred in bursts if they can be temporarily stored in the input/output data transfer unit 105 or the input/output data formation unit 1063. Alternatively, the block obtained as a plain text by decryption processing may be transferred from the external storage device 102 every time it is transferred to the external storage device 102.

On the other hand, the authentication processing unit 108 outputs a block H0 processing end signal to the intermediate data hold unit 1064 when it finishes performing the hash value calculation processing for the block H0 in step S405. In step S423, the intermediate data hold unit 1064 transfers the block H0 processing end signal to the input/output data formation unit 1063.

In step S424, the input/output data formation unit 1063 forms a block H1. The block H1 is formed from "Type" and "Version" received from the input/output data transfer unit 105, "Compressed.length" calculated in step S427, and "fragment" obtained by decryption in the encryption/decryption processing unit 107. The formed block H1 is transferred to the authentication processing unit 108.

In step S425, the authentication processing unit 108 subjects the block H1 to hash value calculation processing using an intermediate value obtained as a result of performing the hash value calculation processing for the block H0 as an initial value.

Block Cn formation/transfer processing, block Cn decryption processing, block Pn transfer processing, and block Hm authentication processing are repeated until there is no packet being processed or no data in a datagram.

The present exemplary embodiment describes a case where AES-128 in the CBC mode and a combination of Keyed-Hashing for Message Authentication Code (HMAC) and SHA-1 are respectively selected as an encryption/decryption processing algorithm and an authentication processing algorithm. AES-128 and SHA-1 are respectively algorithms obtained by processing 128-bit input data in 11 rounds and processing 512-bit input data in 80 steps.

In SSL/TLS, both encryption/decryption processing and authentication processing are required to be performed for data to be processed, which is to be sent and received. When the encryption/decryption processing and the authentication processing are parallelized, the processing speed of SHA-1 becomes a predominant factor that determines the throughput of SSL/TLS record protocol processing if a time required for SHA-1 to process one block is longer than four times a time required for AES-128 to process one block.

On the other hand, if the time required for SHA-1 to process one block is smaller than four times the time required for AES-128 to process one block, the processing speed of AES-128 becomes a predominant factor for determining the throughput of SSL/TLS record protocol processing.

In the present exemplary embodiment, AES-128 and SHA-1 are respectively processed in one round per clock cycle and in two steps per clock cycle on the hardware, and are processed at almost the same processing speeds.

Figure 6B:
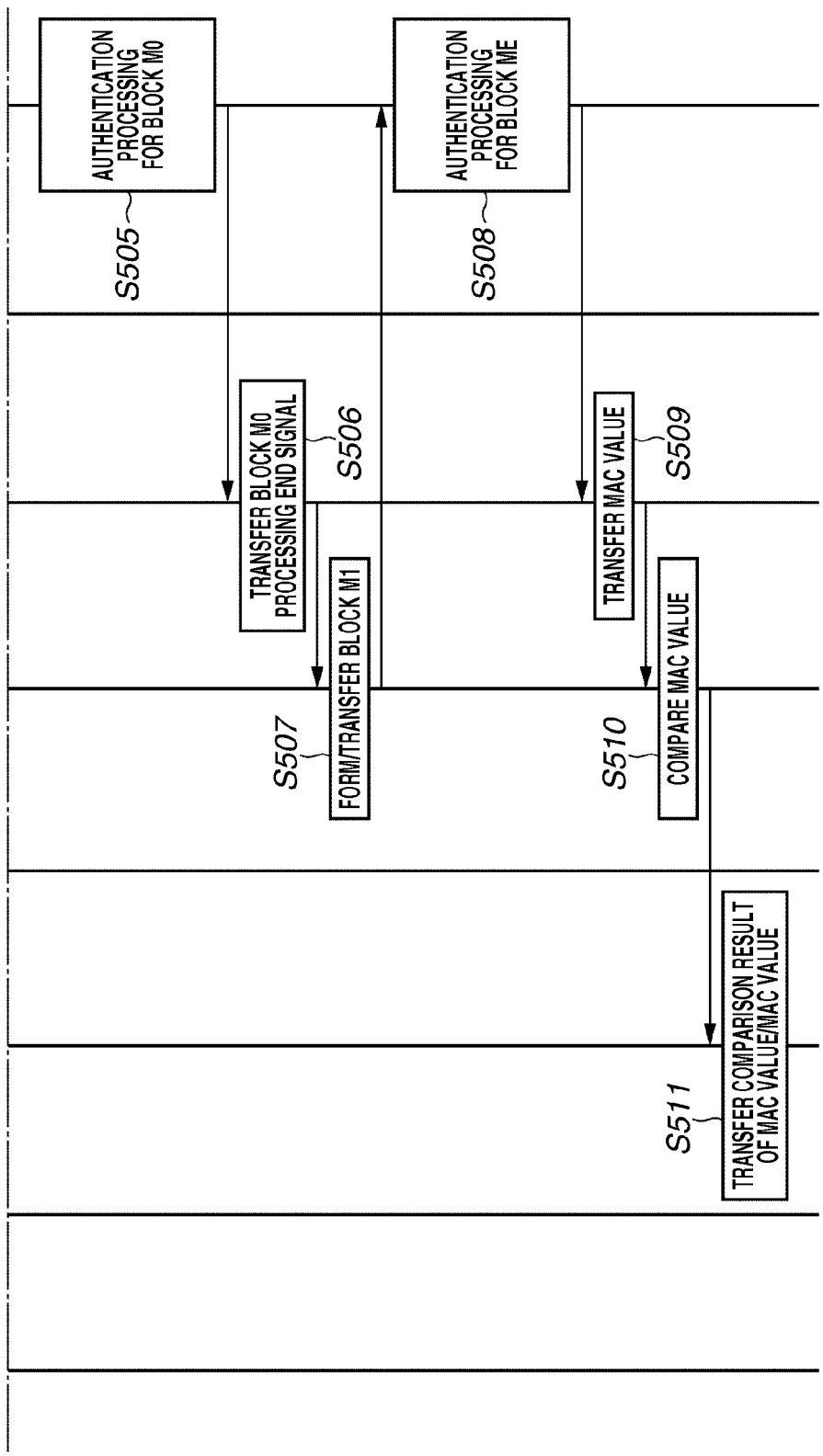
FIG. 6 (6A+6B) illustrates a processing flow of a last portion of the SSL/TLS receiving processing in the exemplary embodiment.

FIG. 6 (6A+6B) illustrates a processing flow of a last portion of the SSL/TLS receiving processing according to the present exemplary embodiment.

In step S512, the input/output data transfer unit 105 finishes transferring input data to the input/output data transfer unit 105 from the external storage device 102 when there is no packet being processed or no input data in a datagram.

Block CE decryption processing in step S513 is similar to the processing in step S409 illustrated in FIG. 5. Block PE transfer processing in step S514 is similar to the processing in step S410 illustrated in FIG. 4.

In step S501, the input/output data transfer unit 105 transfers a block PE obtained by decryption processing to the external storage device 102. In step S502, the authentication processing unit 108 performs hash value calculation processing for a last block HE, and transfers a calculated hash value to the intermediate data hold unit 1064.

In step S503, the intermediate data hold unit 1064 transfers the hash value to the input/output data formation unit 1063, and the input/output data formation unit 1063 stores the hash value. The hash value corresponds to "Hash Value" illustrated in FIG. 3B.

In step S504, the input/output data formation unit 1063 forms a block M0, and transfers the formed block M0 to the authentication processing unit 108. The block M0 corresponds to "K XOR opad" illustrated in FIG. 3B.

In step S505, the authentication processing unit 108 performs hash value calculation processing for the block M0, and outputs a block M0 processing end signal to the intermediate data hold unit 1064. In step S506, the intermediate data hold unit 1064 transfers the block M0 processing end signal to the input/output data formation unit 1063.

In step S507, the input/output data formation unit 1063 forms a block M1 from the hash value calculated by the authentication processing unit 108 and "Padding data" obtained by decryption processing in the encryption/decryption processing unit 107, and transfers the formed block M1 to the authentication processing unit 108. The block M1 corresponds to "Hash Value" and "Padding data" illustrated in FIG. 3B.

In step S508, the authentication processing unit 108 performs hash value calculation processing for the block M1, and transfers a calculated MAC value to the intermediate data hold unit 1064. In step S509, the intermediate data hold unit 1064 transfers the MAC value to the input/output data formation unit 1063.

In step S510, the input/output data formation unit 1063 compares the MAC value calculated by the authentication processing unit 108 with an MAC value obtained by decryption processing. The input/output data formation unit 1063 also transfers a comparison result of the calculated MAC value and the MAC value to the input/output data transfer unit 105. In step S511, the input/output data transfer unit 105 transfers the comparison result of the MAC values to the external storage device 102.

FIGS. 5 and 6 are flowcharts of processing for one packet or datagram. If received encrypted data is subjected to decryption processing/authentication processing, the flowcharts illustrated in FIGS. 5 and 6 are processed for each packet or datagram.

As described above, input/output data processing for calculating and setting parameters required for encryption/decryption processing and authentication processing, and forming input data is performed with the hardware according to setting for SSL/TLS receiving processing. Therefore, collective processing that does not require switching between hardware and software can be performed.

Decryption processing and authentication processing are parallelized, so that the number of times of data transfer can also be reduced. Therefore, the processing speed of the SSL/TLS receiving processing can be improved.

According to the present exemplary embodiment, the hardware calculates parameters required for a series of communication encryption processing and forms input/output data by performing setting required for communication encryption processing and then inputting input data once.

Therefore, there is no overhead caused by switching between hardware processing and software processing, so that the number of times of transfer of data is made smaller than that in the conventional technique. The encryption/decryption processing and the authentication processing can be not only parallelized but also performed in the most suitable order according to encryption and authentication algorithms. Therefore, the throughput of the whole communication encryption processing can be improved.

According to the present exemplary embodiment, when communication encryption processing in an packet or datagram that is being processed is performed, required setting may be performed only once, to input the input data, thereby eliminating the need for a storage capacity storing decrypted data, which has been conventionally required. As a result, memory cost can be reduced.

While AES-128 in the CBS mode has been taken as an example of the encryption algorithm in the present exemplary embodiment, a similar operation can also be implemented in the CTR mode by setting a CTR initial value instead of an IV as a parameter.

While a combination of HMAC and SHA-1 has been taken as an example of the authentication algorithm, SHA-1 can also be replaced with Message Digest 5 (MD5) and SHA-256. While the data sizes of hash values obtained when MD5 and SHA-256 are used are respectively 16 bytes and 32 bytes, the block size of input data is 64 bytes, like that when SHA-1 is used. Therefore, similar processing to that in the present exemplary embodiment can be implemented.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-142243 filed Jun. 27, 2011, which is hereby incorporated by reference herein in its entirety.

What is claimed is:

1. An encryption processing apparatus comprising:
an encryption/decryption unit configured to decrypt data encrypted using a Secure Socket Layer (SSL) or a Transport Layer Security (TLS) protocol;
an authentication unit configured to authenticate the data decrypted by the encryption/decryption unit;
a calculation unit configured to calculate a parameter required for an authentication header from the data decrypted by the encryption/decryption unit; and
an input/output data formation unit configured to form input data to the authentication unit from the calculated parameter and the data decrypted by the encryption/decryption unit,
wherein the encryption/decryption unit first decrypts a last block of encrypted data, and then sequentially decrypts other blocks of the encrypted data starting at a first block, and
wherein the calculation unit calculates the parameter using the last block decrypted by the encryption/decryption unit.

2. The encryption processing apparatus according to claim 1, wherein the input/output data formation unit forms input data to the encryption/decryption unit from the input data to an input/output data processing unit.

3. The encryption processing apparatus according to claim 1, wherein the input/output data formation unit compares a Message Authentication Code (MAC) value obtained by the authentication unit with a MAC value obtained by the encryption/decryption unit.

4. The encryption processing apparatus according to claim 1, wherein the calculation unit calculates a parameter for each packet or for each datagram.

5. The encryption processing apparatus according to claim 2, further comprising an input/output data transfer unit configured to control transfer of input/output data to the input/output data processing unit,
wherein the input/output data processing unit includes an intermediate data hold unit configured to temporarily store the data processed by the encryption/decryption processing unit or data processed by the authentication processing unit.

6. The encryption processing apparatus according to claim 1, wherein the encryption/decryption unit first decrypts the last block of the encrypted data using an initial vector in a second last block of the encrypted data.

7. The encryption processing apparatus according to claim 1, wherein the parameter required for an authentication header is a parameter related to a data length of padding data of the encrypted data.

\* \* \* \* \*